(No Model.)
E. J. LEWIS.
COFFEE MILL HOLDER.
No. 558,289. Patented Apr. 14, 1896.
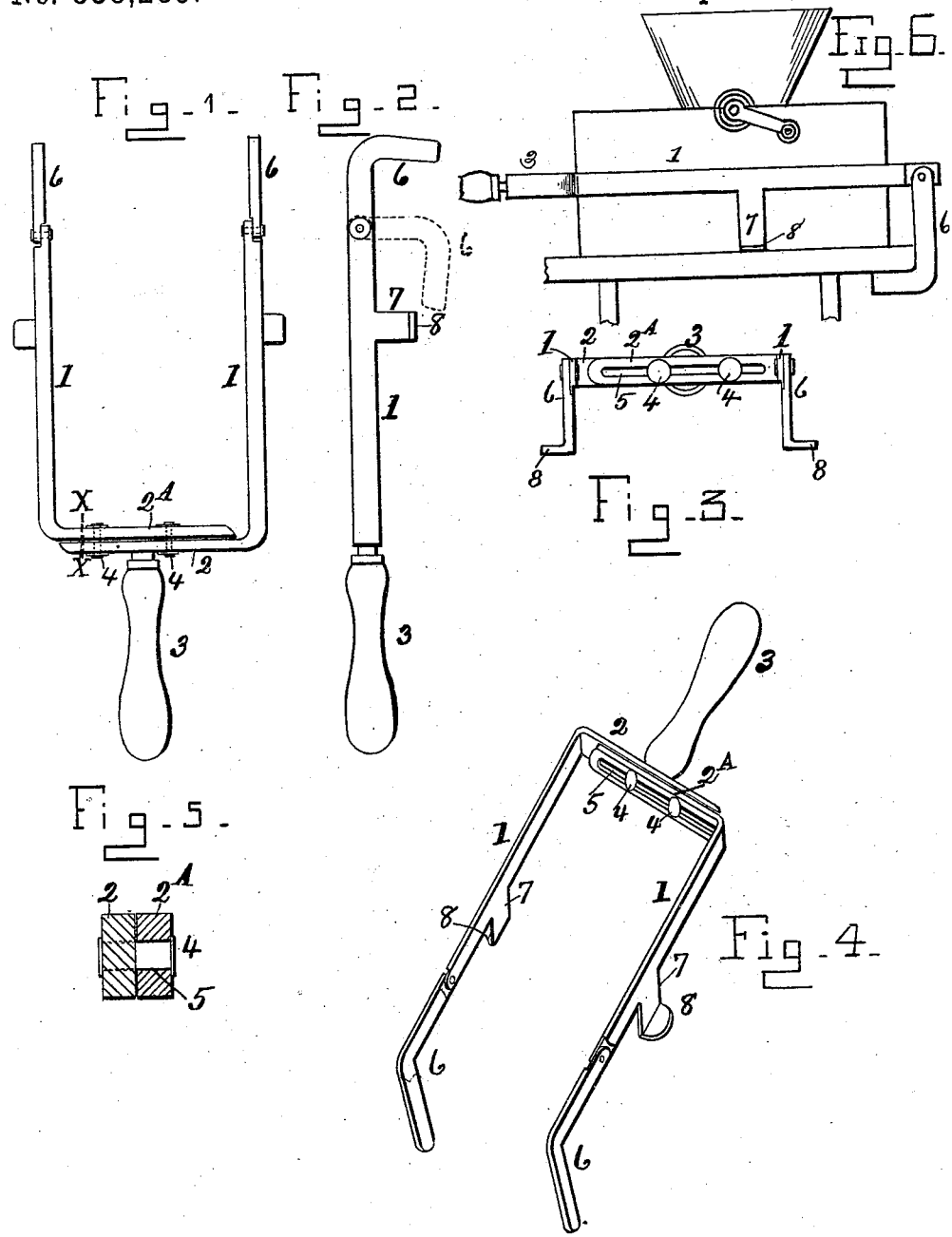
WITNESSES:
INVENTOR
Evan James Lewis
BY O. D. Lewis
ATTORNEY.

UNITED STATES PATENT OFFICE.

EVAN JAMES LEWIS, OF PITTSBURG, PENNSYLVANIA.

COFFEE-MILL HOLDER.

SPECIFICATION forming part of Letters Patent No. 558,289, dated April 14, 1896.

Application filed July 5, 1895. Serial No. 554,984. (No model.)

*To all whom it may concern:*

Be it known that I, EVAN JAMES LEWIS, a citizen of the United States, residing at Pittsburg, in the county of Allegheny and State of Pennsylvania, have invented certain new and useful Improvements in Coffee-Mill Holders; and I do hereby declare the following to be a full, clear, and exact description of the invention, such as will enable others skilled in the art to which it pertains to make and use the same, reference being had to the accompanying drawings, which form a part of this specification.

This invention relates to certain new and useful improvements in holders for kitchen articles and the like and is particularly designed and adapted to be employed for holding a coffee-mill.

The invention has for its object the provision of novel means whereby a coffee-mill may be firmly held and retained in position when the operation of grinding takes place; furthermore, to design a device of the above-referred-to class that will be easily and readily adjusted to conform to various sizes of coffee-mills, and a further object being that the holder may be applied to any table.

The invention aims to contribute a device that will be extremely simple in its construction, strong, durable, and comparatively inexpensive to manufacture.

With the above and other objects in view the invention finally consists in the novel construction, combination, and arrangement of parts to be hereinafter more particularly described, and specifically pointed out in the claim.

In describing the invention in detail reference is had to the accompanying drawings, forming a part of this specification, and wherein like figures of reference indicate similar parts throughout the several views, in which—

Figure 1 is a top plan view of my improved coffee-mill holder. Fig. 2 is a side elevation of the same. Fig. 3 is a front view. Fig. 4 is a view in perspective. Fig. 5 is a transverse sectional view taken on the lines X X of Fig. 1. Fig. 6 is a view illustrating the application in one form of my invention.

In the drawings, 1 1 indicate the sides of the device. The latter are bent at right angles and form the connecting-pieces 2 and $2^A$, the outer connecting-piece 2 being centrally provided with a suitable handle 3 and adjustably connected to the inner connecting-piece $2^A$ by clamp-bolts 4, passing therethrough and through an elongated slot 5 in said connecting-piece $2^A$.

At the forward end of the sides 1 1 are arranged hinged arms 6 6, the latter being substantially right-angled and bent approximately at an angle of eighty-five or ninety degrees. The sides are further provided with downwardly-extending supports 7 7, the latter being bent laterally or horizontally at 8 8.

The operation of the device is as follows: The coffee-mill is placed between the sides. The same being laterally adjustable will permit the operator to fit the same to the sides of the coffee-mill, the arms 6 being swung down to engage or bear upon the under side of the top of the table, at one end, with the supports 7 resting upon the table. The device is then held firmly by the handle with one hand, the other being free to grind the coffee-mill. The device will be further retained or steadied in position by the supports.

It will be readily seen that it is impossible to displace the coffee-mill when the holder is properly adjusted and held.

Particular attention is called to the fact that various changes may be made in the details of construction of the above-described device without departing from the general spirit of my invention.

I claim—

The holder of the character described, consisting of the laterally-adjustable sides having a handle at their connected ends and provided at their opposite ends with pivoted, substantially right-angled arms, and with supports arranged near said pivoted arms, as described.

In testimony that I claim the foregoing I hereunto affix my signature this 20th day of April, A. D. 1895.

EVAN JAMES LEWIS. [L. S.]

In presence of—
 ALBERT J. WALKER,
 H. J. LEVIS.